(12) United States Patent  
Araujo et al.

(10) Patent No.: US 8,266,630 B2  
(45) Date of Patent: Sep. 11, 2012

(54) HIGH-PERFORMANCE XML PROCESSING IN A COMMON EVENT INFRASTRUCTURE

(75) Inventors: Carlos Cesar Araujo, Cary, NC (US); Peter James Brittenham, Pittsboro, NC (US); Nicholas David Butler, Romsey (GB); Robert David Callaway, Holly Springs, NC (US); Adolfo Francisco Rodriguez, Raleigh, NC (US); Richard Eugene Salz, Reading, MA (US)

(73) Assignee: International Business Machines Corporation, Armonk, NY (US)

( * ) Notice: Subject to any disclaimer, the term of this patent is extended or adjusted under 35 U.S.C. 154(b) by 1152 days.

(21) Appl. No.: 11/849,334

(22) Filed: Sep. 3, 2007

(65) Prior Publication Data

US 2009/0064185 A1 Mar. 5, 2009

(51) Int. Cl.
*G06F 3/00* (2006.01)
*G06F 15/16* (2006.01)

(52) U.S. Cl. .......................................... 719/310; 709/203

(58) Field of Classification Search .................. 719/310, 719/318; 709/203
See application file for complete search history.

(56) References Cited

U.S. PATENT DOCUMENTS

| | | | |
|---|---|---|---|
| 6,568,596 B1 | 5/2003 | Shaw | |
| 6,585,778 B1 | 7/2003 | Hind et al. | |
| 6,732,175 B1 | 5/2004 | Abjanic | |
| 6,772,947 B2 | 8/2004 | Shaw | |
| 6,789,126 B1 | 9/2004 | Saulpaugh et al. | |
| 6,822,663 B2 | 11/2004 | Wang et al. | |
| 6,829,745 B2 * | 12/2004 | Yassin et al. | 715/236 |
| 6,901,410 B2 | 5/2005 | Marron et al. | |
| 6,931,532 B1 | 8/2005 | Davis et al. | |
| 6,941,459 B1 | 9/2005 | Hind et al. | |
| 6,961,849 B1 | 11/2005 | Davis et al. | |
| 6,978,367 B1 | 12/2005 | Hind et al. | |
| 7,020,681 B1 | 3/2006 | Ayyagari et al. | |
| 7,028,312 B1 | 4/2006 | Merrick et al. | |
| 7,065,574 B1 | 6/2006 | Saulpaugh et al. | |
| 7,080,094 B2 | 7/2006 | Dapp et al. | |
| 7,096,270 B2 | 8/2006 | Abjanic et al. | |
| 7,124,299 B2 | 10/2006 | Dick et al. | |
| 7,131,116 B1 | 10/2006 | Krishna | |
| 7,134,075 B2 | 11/2006 | Hind et al. | |
| 7,146,422 B1 | 12/2006 | Marlatt et al. | |
| 7,146,643 B2 | 12/2006 | Dapp et al. | |

(Continued)

OTHER PUBLICATIONS

Guido Gehlen, Mobile Web Services for Peer-to-Peer Appications, 2004.*

(Continued)

*Primary Examiner* — Lechi Truong
(74) *Attorney, Agent, or Firm* — Marcia L. Doubet (57) ABSTRACT

Delegation of processing functions to specialized appliances in an enterprise is provided. An appliance typically comprises a combination of hardware and resident firmware that addresses needs in a computing environment, such as by providing common message transformation, integration, security, filtering and other functions. Delegation is carried out by specifying at least one XML function for front-process offloading from a server to a corresponding appliance configured to receive messages pushed towards the server, communicating management directives to the appliance for configuring the appliance to perform the specified XML function(s) according to specific requirements dynamically specified by the server and communicating instructions to the appliance so that the appliance augments received event messages with intermediate processing information based upon the front-process offloading, as received event messages pass through the appliance.

15 Claims, 6 Drawing Sheets

U.S. PATENT DOCUMENTS

| | | | |
|---|---|---|---|
| 7,162,542 B2 | 1/2007 | Abjanic et al. | |
| 7,236,457 B2 | 6/2007 | Joe | |
| 7,243,356 B1 | 7/2007 | Saulpaugh et al. | |
| 7,287,274 B1 | 10/2007 | Houlding | |
| 7,305,615 B2 | 12/2007 | Ross | |
| 7,308,646 B1 | 12/2007 | Cohen et al. | |
| 7,366,781 B2 | 4/2008 | Abjanic | |
| 7,412,518 B1 | 8/2008 | Duigou et al. | |
| 7,415,697 B1 | 8/2008 | Houlding | |
| 7,426,721 B1 | 9/2008 | Saulpaugh et al. | |
| 7,610,406 B2 | 10/2009 | Wu | |
| 7,774,831 B2 | 8/2010 | Kuznetsov et al. | |
| 2002/0019932 A1 | 2/2002 | Toh et al. | |
| 2002/0035579 A1 | 3/2002 | Wang et al. | |
| 2002/0057678 A1 | 5/2002 | Jiang et al. | |
| 2002/0073119 A1 | 6/2002 | Richard | |
| 2002/0091818 A1 | 7/2002 | Cascio et al. | |
| 2002/0143821 A1 | 10/2002 | Jakubowski | |
| 2002/0161801 A1 | 10/2002 | Hind et al. | |
| 2002/0165912 A1 | 11/2002 | Wenocur et al. | |
| 2002/0184213 A1 | 12/2002 | Lau et al. | |
| 2002/0184525 A1 | 12/2002 | Cheng | |
| 2002/0199001 A1 | 12/2002 | Wenocur et al. | |
| 2003/0023633 A1 | 1/2003 | Ross | |
| 2003/0028654 A1 | 2/2003 | Abjanic et al. | |
| 2003/0041302 A1 | 2/2003 | McDonald | |
| 2003/0061062 A1 | 3/2003 | Tucker | |
| 2003/0065874 A1 | 4/2003 | Marron et al. | |
| 2003/0081783 A1 | 5/2003 | Adusumilli et al. | |
| 2003/0084056 A1 | 5/2003 | DeAnna et al. | |
| 2003/0088639 A1 | 5/2003 | Lentini et al. | |
| 2003/0097592 A1 | 5/2003 | Adusumilli | |
| 2003/0177381 A1 | 9/2003 | Ofek et al. | |
| 2003/0177382 A1 | 9/2003 | Ofek et al. | |
| 2003/0197062 A1 | 10/2003 | Shaw | |
| 2003/0200501 A1 | 10/2003 | Friebel et al. | |
| 2003/0229846 A1 | 12/2003 | Sethi et al. | |
| 2003/0234815 A1* | 12/2003 | Delaney | 345/762 |
| 2003/0236813 A1 | 12/2003 | Abjanic | |
| 2004/0010752 A1 | 1/2004 | Chan et al. | |
| 2004/0066745 A1 | 4/2004 | Joe | |
| 2004/0088374 A1 | 5/2004 | Webb et al. | |
| 2004/0205597 A1 | 10/2004 | Abjanic | |
| 2004/0210754 A1 | 10/2004 | Barron et al. | |
| 2004/0230660 A1 | 11/2004 | Abjanic et al. | |
| 2005/0114448 A1 | 5/2005 | Skomra | |
| 2005/0273772 A1 | 12/2005 | Matsakis et al. | |
| 2006/0004729 A1* | 1/2006 | Zhilyaev et al. | 707/3 |
| 2006/0265689 A1 | 11/2006 | Kuznetsov et al. | |
| 2006/0288122 A1 | 12/2006 | Abjanic et al. | |
| 2007/0094392 A1* | 4/2007 | Stone et al. | 709/225 |
| 2007/0113222 A1 | 5/2007 | Dignum et al. | |
| 2007/0220170 A1 | 9/2007 | Abjanic et al. | |
| 2007/0226753 A1 | 9/2007 | Nikols et al. | |
| 2008/0046811 A1 | 2/2008 | Ross | |

OTHER PUBLICATIONS

Kuznetsov et al., U.S. Appl. No. 10/745,326, filed Dec. 22, 2003, Restriction Requirement, Mar. 31, 2008, 6 pages.

Kuznetsov et al., U.S. Appl. No. 10/745,326, filed Dec. 22, 2003, Office Action, Nov. 21, 2008, 5 pages.

Kuznetsov et al., U.S. Appl. No. 10/745,326, filed Dec. 22, 2003, Office Action, May 11, 2009, 5 pages.

Kuznetsov et al., U.S. Appl. No. 10/745,326, filed Dec. 22, 2003, Office Action, Nov. 19, 2009, 6 pages.

Kuznetsov et al., U.S. Appl. No. 10/745,326, filed Dec. 22, 2003, Advisory Action, Jan. 29, 2010, 3 pages.

Kuznetsov et al., U.S. Appl. No. 10/745,326, filed Dec. 22, 2003, Notice of Allowance, Mar. 31, 2010, 16 pages.

WebSphere DataPower XML Accelerator XA35 Features and benefits, http://www-306.ibm.com/software/integration/datapower/xa35/features/; IBM; Dec. 2007.

WebSphere DataPower XML Security Gateway XS40 Features and benefits, http://www-306.ibm.com/software/integration/datapower/xs40/features/; IBM; Dec. 2007.

WebSphere DataPower Integration Appliance XI50 Features and benefits, http://www-306.ibm.com/software/integration/datapower/xi50/features/; IBM; Dec. 2007.

* cited by examiner

HIGH-PERFORMANCE XML PROCESSING IN A COMMON EVENT INFRASTRUCTURE

BACKGROUND OF THE INVENTION

The present invention relates to systems, computer-implemented methods and computer program products for high-performance XML processing in a Common Event Infrastructure.

Service-Oriented Architectures enable the creation of composite applications that are comprised of reusable, loosely coupled service components. Using the Simple Object Access Protocol (SOAP), Service Oriented Architecture clients can invoke web services built atop the eXtensible Markup Language (XML) without explicit support for a wide variety of transport protocols and formats. A SOAP façade may even be constructed that sits in front of a legacy service so as to enable web service virtualization where clients invoke a virtualized version of the underlying service, thereby mitigating the need to understand intricate details of the service's implementation.

One application of Service Oriented Architecture principles is in the area of IT Services Management (usually referred to as ITSM) where XML and SOAP integrate for control and monitoring of network and computing resources. In this context, a corresponding management framework supports a Common Event Infrastructure (CEI) that uses XML Common Base Event (CBE) messages to relay the occurrence of events to a suitable process for subsequent analysis. For example, a Common Event Infrastructure server may deliver event messages to interested subscribers and/or store event messages in a suitable database to enable further processing, such as during subsequent correlation, query operations, event message management operations, problem determination and off-line auditing.

However, SOAP-based interactions may require XML parsing, object de-serialization processing, the creation of in-memory objects that represent the XML-encoded data and/or other SOAP-based payload processing, which can burden the corresponding Common Event Infrastructure server(s). For example, the additional processing requirements of such SOAP interactions may lead to performance issues, especially in the context of Common Event Infrastructure services management as the volume of event messages grows higher, e.g., as a result of the complexity, level of automation, and/or increasing size of an enterprise.

To address the additional processing requirements of Service Oriented Architecture implementations, specialized Service Oriented Architecture appliances have been introduced which are built purposely for performing traditional middleware functions. The appliance form-factor can provide a secure, consumable packaging for deploying certain middleware activities. However, the specialized Service Oriented Architecture appliances may not be able to maintain a level of flexibility required by the Common Event Infrastructure server. For example, a Common Event Infrastructure server may interact in nonstandard and extensible ways with the rest of the Service Oriented Architecture management framework. Therefore, a fundamental trade-off exists between the flexibility of a software-based Common Event Infrastructure server and the high performance of specialized Service Oriented Architecture appliances.

BRIEF SUMMARY OF THE INVENTION

According to aspects of the present invention, systems, methods and computer program products are provided for delegating processing functions to specialized appliances in an enterprise. An appliance typically comprises a combination of hardware and resident firmware that may be purpose driven to address a need in a computing environment. For example, appliances built purposely for performing traditional middleware service oriented architecture (SOA) functions may simplify, help secure or accelerate XML and Web services deployments while extending an existing SOA infrastructure across an enterprise, such as by providing common message transformation, integration, routing, security, filtering and other appropriate functions. In an exemplary implementation, processing functions are delegated by specifying at least one XML function for front-process offloading from a server to a corresponding appliance configured to receive messages pushed towards the server, communicating management directives to the appliance for configuring the appliance to perform the specified XML function(s) according to specific requirements dynamically specified by the server and communicating instructions to the appliance so that the appliance augments received event messages with intermediate processing information based upon the front-process offloading, as received event messages pass through the appliance, e.g., as the result of the intermediate processing by the appliance is forwarded to a back-end server, such as a Common Event Infrastructure server.

DETAILED DESCRIPTION OF THE INVENTION

According to various aspects to the present invention, the flexibility gap between software based Common Event Infrastructure server applications and specialized Service Oriented Architecture appliances is closed by providing mechanisms to pin performance-sensitive XML operations on Service Oriented Architecture appliance(s) while maintaining a parallel software-based Common Event Infrastructure server that is capable of interacting with the rest of the Service Oriented Architecture management framework. Implementation of mechanisms may be carried out using a dynamic exchange of state information between the Common Event Infrastructure server and each corresponding appliance, as will be described in greater detail herein.

Various aspects of the present invention further describe mechanisms for leveraging the high-performance XML processing of Service Oriented Architecture appliances within a Common Event Infrastructure server, such as by specifying which bulk-work XML functions are appropriate for front-process offloading to a corresponding Service Oriented Architecture appliance. Mechanisms may also be provided to dynamically install/configure offloaded XML processing from the Common Event Infrastructure server to the appropriate appliance. Still further, mechanisms may be provided that build on standards-based protocols to augment requests, i.e., event messages received by an appliance, with intermediate processing information as event messages pass through the Service Oriented Architecture appliance to the Common Event Infrastructure server or other destination. As such, Common Event Infrastructure policies may be dynamically pushed to fronting Service Oriented Architecture appliances, enabling the transfer of expensive XML-based processing from the server to the appliance.

Figure 1:
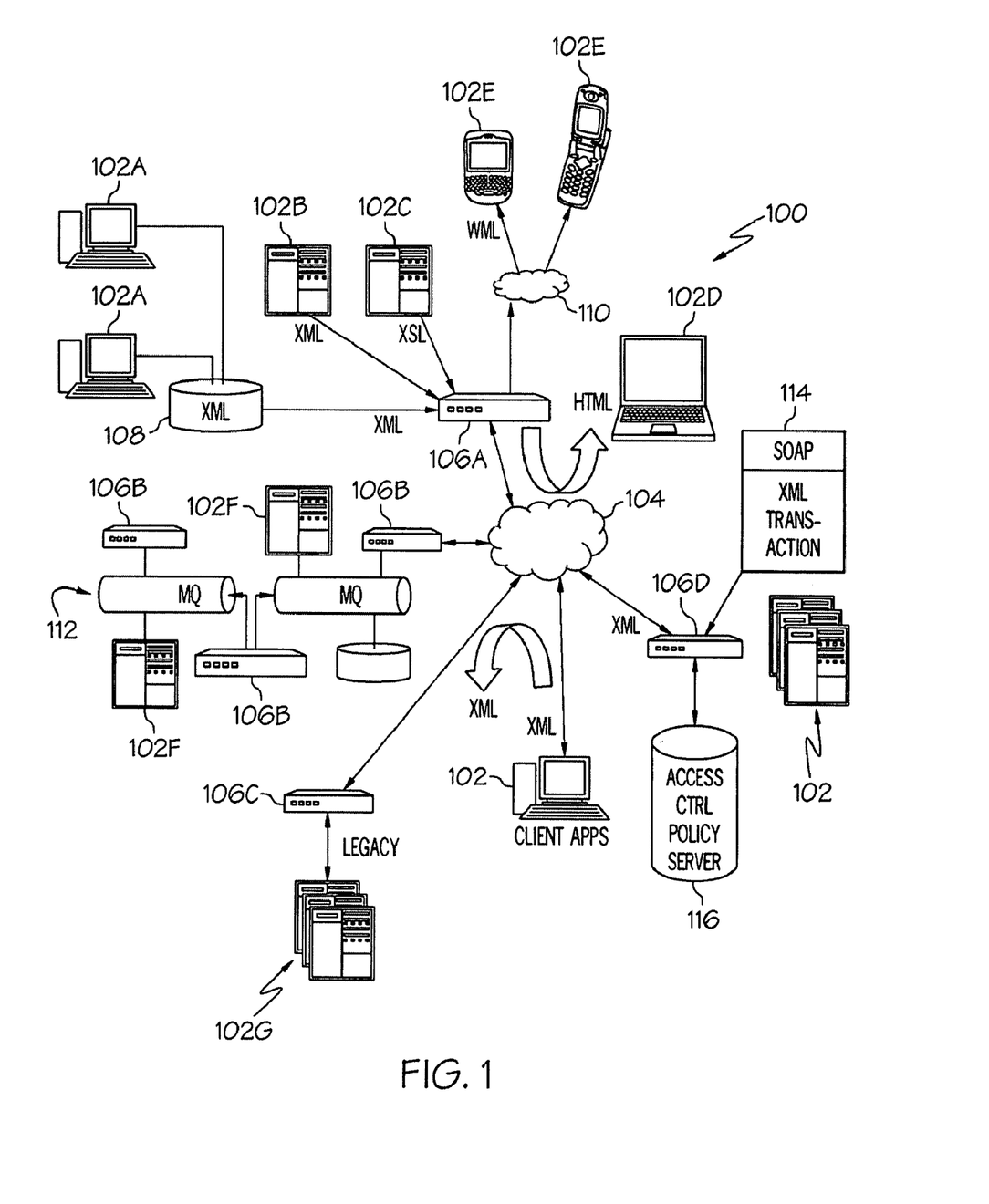
FIG. 1 is a schematic illustration of an exemplary system according to various aspects of the present invention.

Referring now to the drawings and particularly to FIG. 1, a general diagram of an enterprise 100 is illustrated. The enterprise 100 comprises a plurality of hardware and/or software processing devices, designated in general by the reference numeral 102, which are linked together by a network 104. Typical processing devices 102 may include servers, personal computers, notebook computers, transactional systems, pervasive computing devices such as a personal data assistant (PDA), palm computers, cellular access processing devices, special purpose computing devices, printing and imaging devices, facsimile devices, storage devices and/or other devices capable of communicating over the network 104. The processing devices 102 may also comprise software, including applications and servers that interact with various databases, spreadsheets, structured documents, unstructured documents and/or other files containing information, as well as processing devices that participate in the management framework of the environment 100.

The network 104 provides communications links between the various processing devices 102, and may be supported by networking components that interconnect the processing devices 102, including for example, routers, hubs, firewalls, network interfaces, wired or wireless communications links and corresponding interconnections. Moreover, the network 104 may comprise connections using one or more intranets, extranets, local area networks (LAN), wide area networks (WAN), wireless networks (WIFI), the internet, including the world wide web, and/or other arrangements for enabling communication between the processing devices 102, in either real time or otherwise, e.g., via time shifting, batch processing, etc.

The illustrated enterprise 100 also includes a plurality of appliances, which are designated in general, by the reference numeral 106. An appliance 106 typically comprises a combination of hardware and resident firmware that is purpose driven to address a need in the computing environment 100. In general, appliances 106 may be used to assist in building an architecture that is easy to scale and manage, such as by making application integration a network function, by providing transport-independent transformation, routing, and auditing, security, etc., some examples of which are described below.

For purposes of illustration, the various appliances 106 shown in FIG. 1 comprise middleware Service Oriented Architecture appliances that address performance burdens exhibited by conventional Service Oriented Architecture software solutions, e.g., which may otherwise be executed on one or more of the processing devices 102.

A first exemplary appliance 106A may comprise, for example, an accelerator device, such as a DataPower® XA35 XML Accelerator by International Business Machines (IBM) Corporation of Armonk, N.Y., USA. ("DataPower" is a registered trademark of IBM in the United States, other countries, or both.) The accelerator appliance 106A may be utilized to deliver common message transformation, integration, and routing functions, such as by performing XML transformations, XML compression and other essential XML processing and other resource-intensive tasks.

The accelerator appliance 106A is shown for exemplary purposes operating in an XML proxy mode of operation and is interconnected to a plurality of content and application generation processing devices 102A which generate, for example, XML fragments via an XML database 108. Further, the accelerator appliance 106A may be connected to one or more web server(s) 102B, application server(s) 102C, devices 102D across the network 104, e.g., as schematically represented by the laptop computer, to wireless networks 110, which may communicate with wireless devices 102E such as cell portable wireless processing devices including cell phones, personal data assistants and other wireless pervasive computing devices, etc.

As a further example, integration appliances 106B, such as a plurality of DataPower XI50 Integration Appliances by IBM, are illustrated as integrating with message and queuing (MQ) system 112 to interconnect and integrate various processing devices 102F that may perform, for example, program-to-program communication using message queuing. The integration appliances 106B may transform data between disparate message formats, including binary, legacy, and XML, and may provide message routing and security, MQ/HTTP/FTP connectivity, and transport mediation.

Another exemplary integration appliance, 106C is illustrated as coupling legacy computing devices 102G to the network 104, e.g., to transform XML communications received from client applications across the network 104 into appropriately formatted messages for the legacy devices. Additionally, the integration appliance 106C may transform legacy communications to XML (or other suitable format) for communication across the network 104.

Still further, yet another exemplary appliance 106D, such as a DataPower XML Security Gateway XS40 by IBM may provide protection against XML vulnerabilities by acting as an XML proxy and by performing XML wellness checks, buffer overrun checks, XML schema checks, XML filtering, XML Encryption and Digital Signature features, content-based routing, XML denial of service protection and other appropriate forms of network security.

Figure 2:
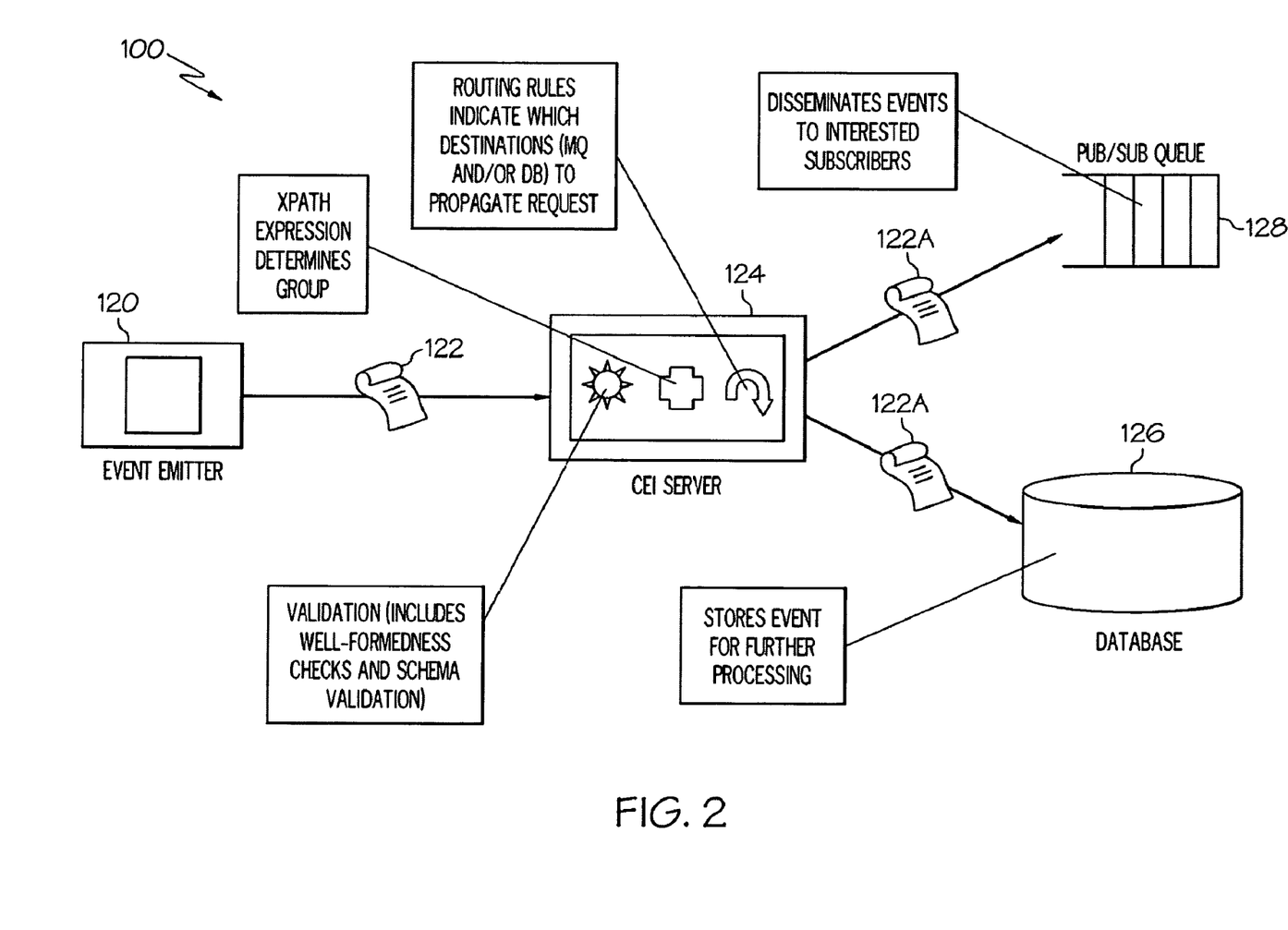
FIG. 2 is a block diagram of a portion of a system illustrating certain functions performed by a server according to various aspects of the present invention.

Referring to FIG. 2, a block diagram illustrates a portion of a management framework of an enterprise system according to various aspects of the present invention. As shown, the enterprise includes one or more event emitters 120 that generate event messages 122 from time to time. In practice, any number of event emitters 120 may be deployed across the enterprise, however only one is illustrated for purposes of clarity of discussion herein. A representative event emitter 120 may comprise software, e.g., an application or event message log. The representative event emitter 120 may also comprise hardware, such as an event message logging device or adapter and/or a combination of hardware and software.

An event message 122 may be used to represent a change in the state of a hardware or software component or subcomponent, processes, feature, characteristic or other aspect that is supported, maintained, monitored or otherwise associated with the corresponding event emitter 120. Event messages 122 may also be used to represent a change in the status of information or knowledge of the event emitter 120 or of devices, processes or other hardware and/or software supported, maintained, monitored or otherwise associated with a corresponding event emitter 120. An event message 122 may further comprise information that may, in general, be of interest to someone or some process monitoring the enterprise or a subset of the enterprise.

In an exemplary arrangement, the event messages 122 may be either coded into or otherwise converted into unified Common Base Event formatted event messages. The utilization of Common Base Event formatted event messages may be useful, for example, when utilizing autonomic management systems to implement various aspects of the present invention as the Common Base Event formatted event messages can define the structure of an event message 122 sent as the result of a situation in a consistent and common format. For example, Common Base Event formatted event messages may be consistently formatted to provide information such as the source of a corresponding situation, the reporter of the situation, situation data, properties or attributes that describe the associated situation and context properties or attributes to correlate the associated situation with other situations, etc. The event messages 122 may alternatively be formatted using other techniques.

The event emitter 120 may provide event messages via local data collection, via remote data collection or via other suitable means, such as to a generic log adapter (GLA) or other appropriate source to convert event message data into a Common Base Event XML event message format. Conversion from a device-specific, native log or other data type to Common Base Event format may also be performed natively, e.g., via the event emitter 120 or at an applications programming interface where software is utilized to emit the event messages 122. The event emitter 120 may further couple to an enterprise service bus (ESB) or other suitable architectural platform that unifies message oriented, event message-driven and service oriented approaches to integration to provide Common Base Event formatted event messages.

The event messages 122 generated by the event emitter 120 are forwarded to a Common Event Infrastructure server 124, e.g., server software executing on one or more of the processing devices 102. The Common Event Infrastructure server 124 provides a subscription facility to forward the event messages 122 to the appropriate event message subscriber(s). In this regard, the Common Event Infrastructure server 124 may implement a consistent, unified set of application program interfaces (APIs) and a corresponding infrastructure for the creation, transmission, persistence and distribution of Common Base Event formatted event messages 122A. The routed Common Base Event formatted event messages from the Common Event Infrastructure server 124 are given a designation of 122A (compared to the event message designator 122) to indicate that the Common Event Infrastructure server 124 may augment the information contained in the received event messages 122.

Upon receiving an incoming event message 122, the Common Event Infrastructure server 124 may first ensure the validity of the event message 122 and/or and its corresponding message. For example, the Common Event Infrastructure server 124 may perform well-formedness checks, schema validation, and/or other validation checks such as those associated with XML Denial-of-Service protection.

The Common Event Infrastructure server 124 may then determine which processing devices 102, storage devices etc., within the management framework of the corresponding enterprise 100 would be interested in the received event message 122. For example, the Common Event Infrastructure server 124 may apply a sequence of XPath expressions against the received event message 122 to determine the Common Event Infrastructure group or groups to which the event message 122A belongs. The identified group(s) determines the mechanism by which the event message 122A is persisted and identifies the collection of subscriber(s) that wish to be notified of the occurrence of the event message 122A. In this regard, Common Event Infrastructure groups are logical arrangements of one or more processing devices 102, storage devices and/or other enterprise components that may have an interest in event messages 122A. The "subscribers" are also enterprise components that may be interested in the content of received event messages 122, including hardware such as storage devices and software such as logs, analyzers, analysis and/or query software, etc., which may be executed on one or more of the processing devices 102.

As an example, FastXpath may be utilized to process the Common Base Event encoded event message information. The FastXPath engine implements the XPath language for addressing parts of an XML document. Moreover, the FastXPath engine is designed to be used by both XSLT and XPointer, and may present a convenient platform to be utilized by the Common Event Infrastructure server 124 as it integrates with existing code generating tools. Still further, the FastXPath engine can extract XML schema-specific metadata from the object it queries. However, in practice, other models may be used to present and access the event message data.

Groups may be notified by the Common Event Infrastructure server 124, for example, by using suitable routing rules that indicate destinations such as queues, databases, etc. to complete routing of each received event message 122. In this regard, each received event message 122 may be of interest to more than one group, and can therefore be persisted to multiple data stores 126 that store event messages for further processing. Each received event message 122 may also/alternatively be published to one or more collections of subscribers. Under this arrangement, the Common Event Infrastructure server 124 may publish event messages 122A, such as by posting the event messages 122A to one or more publication/subscription queues 128 to which interested subscribers have registered. The publication/subscription queue(s) 128 may then disseminate queued event messages 122A to interested subscribers.

Figure 3:
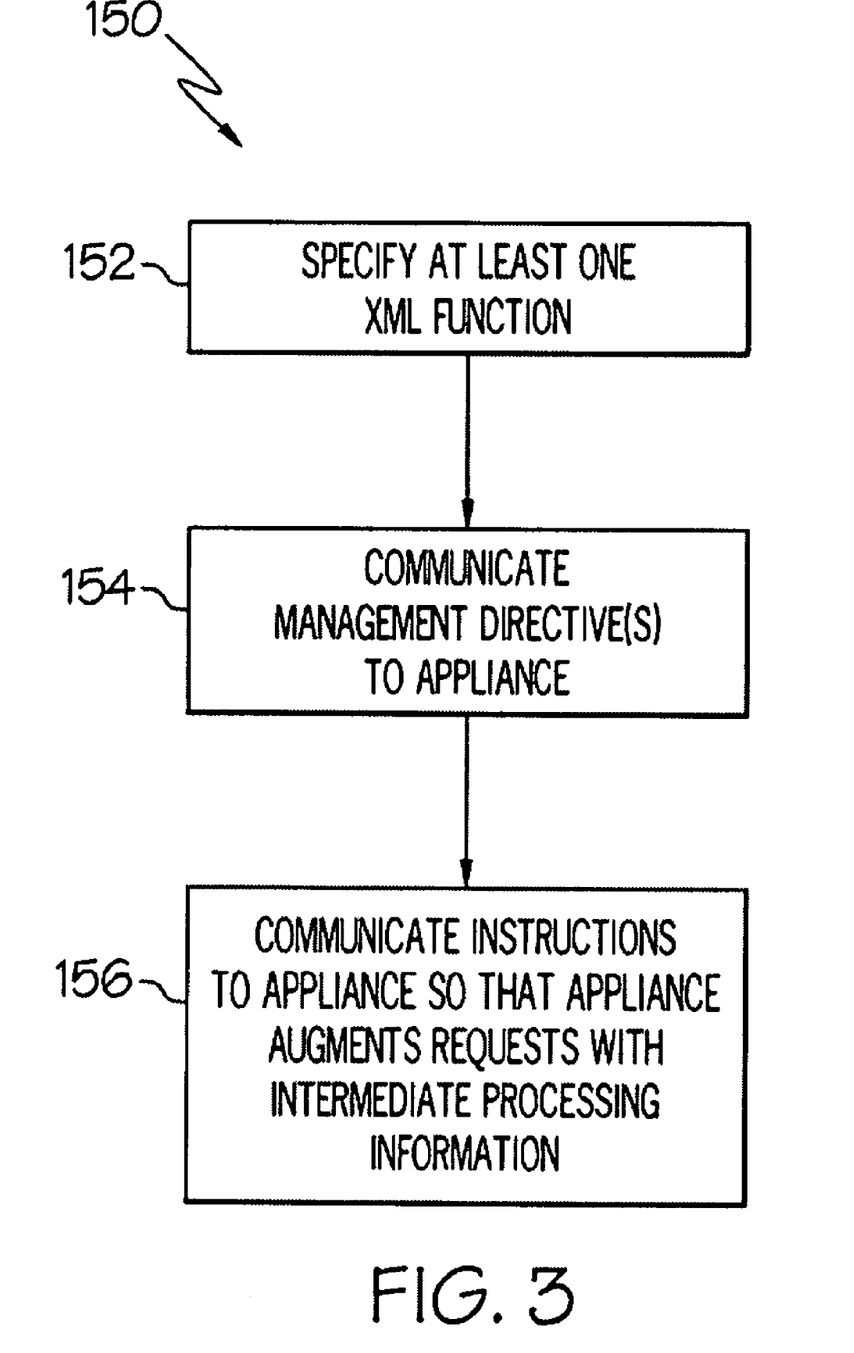
FIG. 3 is a flow chart illustrating a method of offloading functions from a server to a corresponding appliance according to various aspects of the present invention.

Referring to FIG. 3, a flow chart illustrates a method 150 and corresponding computer program flow to implement computer program instructions for delegating processing functions to specialized appliances 106 in an enterprise 100. At least one XML function is specified at 152 for front-process offloading from a server, e.g., the Common Event Infrastructure server 124, to a corresponding appliance 106. Management directives are communicated to the appliance at 154 to configure the appliance 106 to perform the specified XML function(s). Such directives, which may be dynamically assigned from the Common Event Infrastructure server 124, may require configuring the XML functionality on the appliance 106. Further, instructions may be communicated at 156 to the appliance 106 so that the appliance 106 augments received event messages 122 with intermediate processing information based upon the specified XML functions/front-process offloading as received event messages 122 pass through the appliance 106.

As an example, the Common Event Infrastructure server 124 may specify an XML function, e.g., validation to be offloaded to a corresponding appliance 106. The Common Event Infrastructure server 124 may further communicate a management directive to the appliance 106 to specify the validation requirement. In response to the management directive, the appliance 106 becomes configured to implement the defined XML function of validation for event messages 122 received by the appliance 106 according to the specific validation requirements dynamically specified by the Common Event Infrastructure server 124. Upon configuring the appliance 106, event messages 122 that pass the specified validation requirement(s) are forwarded to a corresponding destination, e.g., the Common Event Infrastructure server 124, a data source, a subscription/publication queue or other destination that may be interested in the event. Event messages 122 that do not meet the specified validation requirement(s) may be discarded, etc. at the appliance 106. As such, the number of events 122 and/or the amount of processing required by the Common Event Infrastructure server 124 can be significantly reduced.

As another example, the Common Event Infrastructure server 124 may specify an XML function such as routing to be offloaded to a corresponding appliance 106. The Common Event Infrastructure server 124 may further communicate a management directive to the appliance 106 to specify the message processing and classification function requirements, wherein event messages 122 are forwarded to a corresponding destination based upon the classification. A communicated management directive may also define one or more specified XML functions as routing rule requirement(s) that designate where to route received event messages 122.

As yet a further example, a management directive communicated to the appliance 106 may comprise issued policy directives to the appliance 106 based upon dynamically driven conditions in the Common Event Infrastructure server 124 as the Common Event Infrastructure server 124 communicates with devices on the corresponding enterprise 100. For example, where the appliance 106 comprises a service oriented architecture middleware appliance, the communicated management directives to the appliance 106 by the Common Event Infrastructure server 124 may dynamically issue Simple Object Access Protocol based distributed management directives to the appliance 106 to instruct the appliance 106 as to how event messages 122 that are flowing towards the Common Event Infrastructure server 124 are to be managed.

Figure 4:
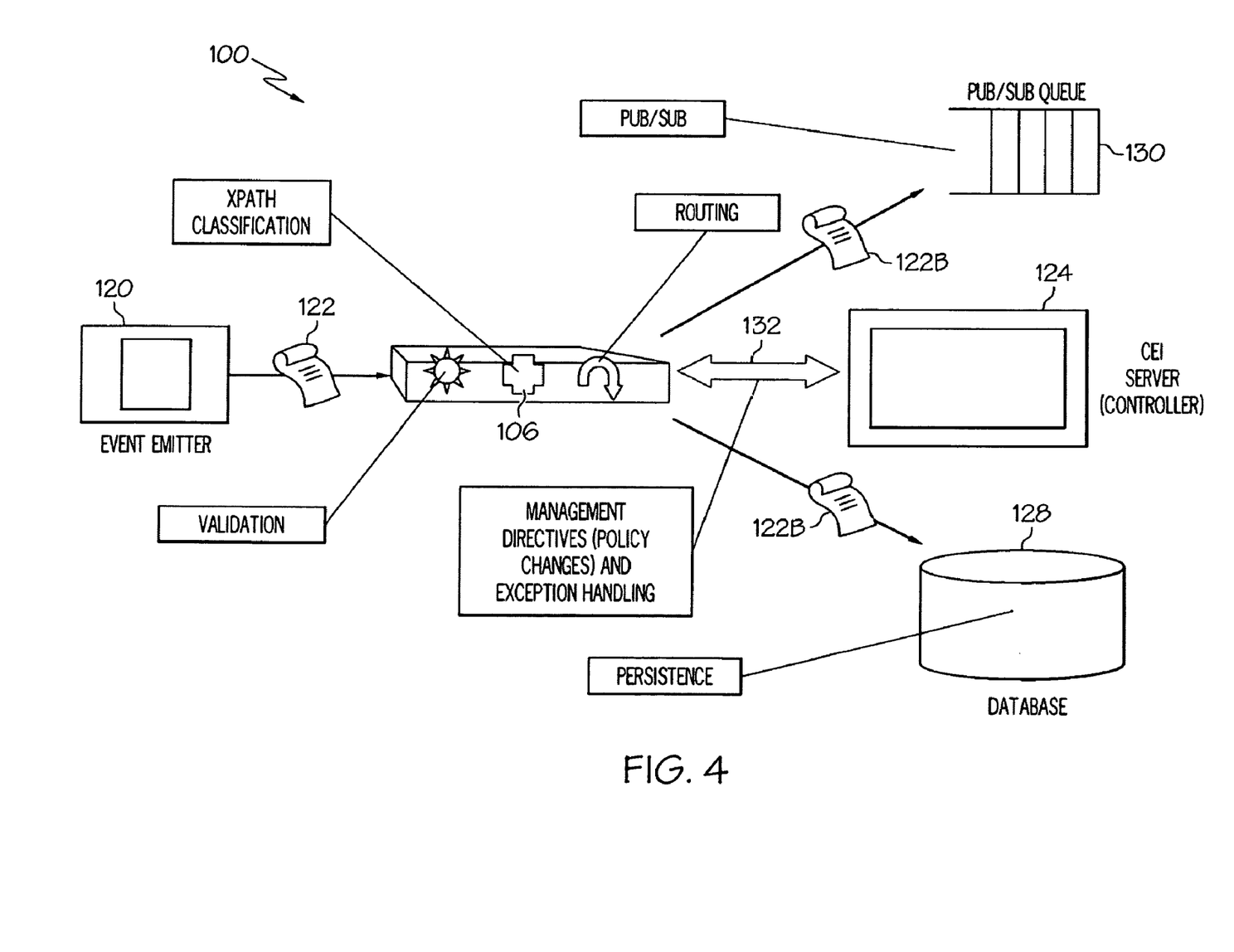
FIG. 4 is a block diagram of a portion of a system illustrating the offloading of certain functions to an appliance which are typically performed by a server according to various aspects of the present invention.

Referring to FIG. 4, a block diagram illustrates a portion of the enterprise 100 that may be utilized to implement the methods described with reference to FIG. 3. As shown, the event emitter 120 generates event messages 122, which are pushed from the event emitter 120 towards the Common Event Infrastructure server 124 through the appliance 106. In this regard, at least a portion of the event message processing has been off-loaded from the Common Event Infrastructure server 124 to the corresponding appliance 106. As illustrated, event messages 122 that have passed through the appliance 106 have been given a designation of 122B to indicate that the event message has been processed by the appliance 106, and may be augmented to include additional information that is added to the event message by the appliance 106.

The Common Event Infrastructure server 124 communicates with the appliance 106, as designated by the reference 132, to convey management directives such as policy information, configuration information and/or exception handling information to the appliance 106. For example, the Common Event Infrastructure server 124 may dynamically issue SOAP-based distributed management directives to the appliance 106 so as to instruct the appliance 106 as to how event messages are to be managed. Examples of the handling of event messages have been previously described with reference to FIG. 3.

In the illustrative example shown, the Common Event Infrastructure server 124 has specified XML functions including validation, classification and routing to be offloaded to the corresponding appliance 106. The Common Event Infrastructure server 124 has further communicated one or more management directives to the appliance 106 to specify the desired validation requirement(s), classification requirements and routing requirements desired by the particular application. In response to the management directive(s), the appliance 106 is configured to implement the defined XML function of validation for event messages 122 received by the appliance 106 according to requirements specified in the directive. In this regard, the appliance 106 may be directed to perform validation checks such as well-formedness checks, schema validation, etc., on incoming messages 122.

As shown, the Common Event Infrastructure server 124 has also issued a directive to the appliance 106 to perform XPath classification and/or other necessary message processing and classification, e.g., based upon requirements specified by the Common Event Infrastructure server 124. Still further the Common Event Infrastructure server 124 has issued a directive to the appliance 106 to perform necessary routing functions, e.g., according to server specified routing requirements, such as to route event messages based upon the results of validation and Xpath classifications to the Common Event Infrastructure server 124, to a data source such as one or more suitable databases 128, to one or more publication/subscription queues 130, etc. For example, as shown in FIG. 4, the appliance 106 has validated, classified and routed a first event 122B to a publication/subscription queue 130, but has routed a second event 122B to a database for persistence.

As an illustrative example, the appliance 106 may support a high-performance XML filtering/firewall engine, which may be leveraged in a Common Event Infrastructure environment to filter away unwanted event messages 122. This alleviates event message emitters 120 and the Common Event Infrastructure server 124 from the burden of filtering. As such, the appliance 106 may receive a management directive from the Common Event Infrastructure server 124 to interrogate individual SOAP/XML transactions within event messages 122 and determine whether individual event messages 122 should be allowed/routed based on the message payload contents, security policy information, identity information or other relevant factors. In this regard, the security features implemented by the appliance 106 may access a variety of policy enforcement points and central policy repositories within the enterprise, etc. Thus, the high speed, specialty processing capability of the appliance can filter out undesired event information.

The policy directives issued to the appliance 106 may be driven by dynamic conditions in the Common Event Infrastructure server 124 as the Common Event Infrastructure server 124 communicates with other processing devices 102 across the enterprise 100. For example, an event message trigger may detect a problem for which more detailed event message processing is required. Upon detecting a corresponding trigger condition, the Common Event Infrastructure server 124 may issue an appropriate management request to direct the appliance 106 to push detailed event messages 122 to a corresponding backing store or additional subscribers. Additionally, there may be cases where the appliance 106 is unsure how to process event messages 122, in which case these exception event messages are flowed to the Common Event Infrastructure server 124 for processing. According to various aspects of the present invention, the Common Event Infrastructure server 124 maintains the capability of performing all server functions, including those described more fully herein. This parallel (or partially parallel) capability along with the appliance(s) 106 enables the Common Event Infrastructure server 124 to provide access methods to the event messages 122, such as by providing access APIs to query against persisted event messages 122.

Figure 5:
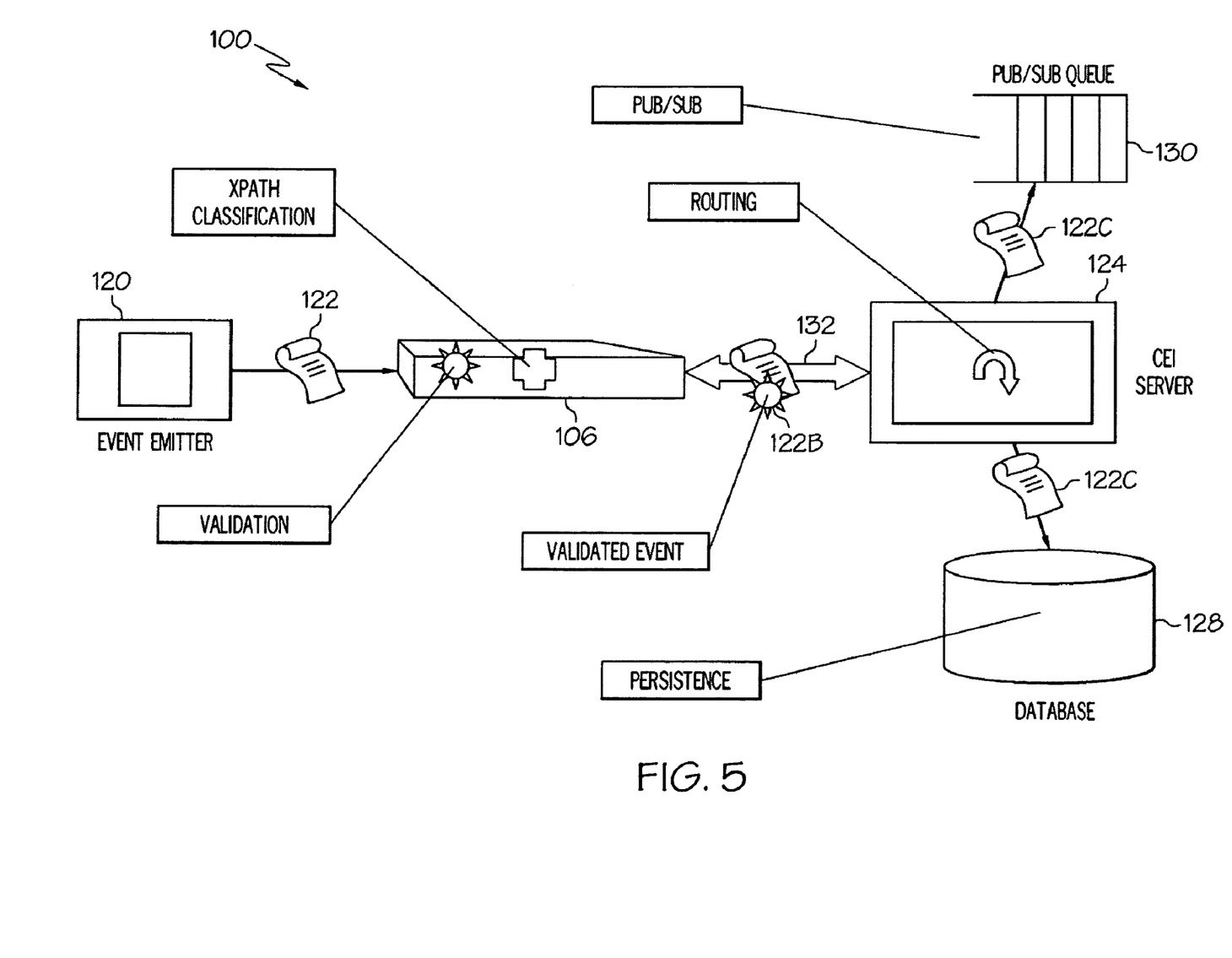
FIG. 5 is a block diagram of a portion of a system illustrating the offloading of certain functions to an appliance and reserving certain other functions for processing by a corresponding server according to various aspects of the present invention.

Referring to FIG. 5, a block diagram illustrates a portion of the enterprise system 100. As shown, the event emitter 120 generates event messages 122, which are pushed from the event emitter 120 towards the Common Event Infrastructure server 124 via an appliance 106. In this example, only certain aspects of the Common Event Infrastructure processing flow need be offloaded to the appliance 106. As noted with reference to FIG. 4, the Common Event Infrastructure server 124 pushes information 132, such as management directives including policy information, configuration information and/or exception handling, to the appliance 106.

In the illustrated example, the management directives issued to the appliance 106 instruct the appliance 106 to perform validation checks such as well-formedness checks, schema validation, etc., on incoming event messages 122, as well as to perform XPath classification and/or other necessary message processing and classification as described in greater detail above. However, in the illustrated example, events 122 that pass through the validation and XPath classification of the appliance 106 are forwarded to the Common Event Infrastructure server 124 for routing operations. As noted above, the event messages 122 that have passed through the appliance 106 have been given a designation of 122B to indicate that the event message has been processed by the appliance 106, and may be augmented to include additional information which is added to the event message by the appliance 106. Any additional required routing functions, such as to route requests to a data source such as one or more suitable databases 128 and/or one or more publication/subscription queues 130 etc., is left to the Common Event Infrastructure server 124. As such, the messages routed by the Common Event Infrastructure server 124 have been given a designation of 122C to indicate that the event message has been processed by both the appliance 106 and the Common Event Infrastructure server 124, and may be augmented to include additional information which is added to the event message 122 by the appliance 106 and/or the Common Event Infrastructure server 124.

For example, the Common Event Infrastructure server 124 may choose to persist event messages 122C to data source 128, which may comprise a nonstandard database or file system or publish event messages 122C using nonstandard messaging engines. The Common Event Infrastructure server 124 enables that extensibility, while still leveraging the appliance 106 for the expensive XML processing involving validation and classification.

Accordingly, performance-sensitive XML operations may be offloaded to appliance(s), such as Service Oriented Architecture appliances, while maintaining a parallel software-based Common Event Infrastructure server that is capable of interacting with the rest of the Service Oriented Architecture management framework. Moreover, state information, such as configurations, policies, exception handling etc., may be dynamically exchanged between the Common Event Infrastructure server 124 and the appliance 106, e.g., as management directives to configure each corresponding appliance to handle XML processing that would otherwise be required by the Common Event Infrastructure server 124. By allowing the appliance(s) 106 to handle processor-intensive processing of event messages 122, the Common Event Infrastructure server 124 is free to perform additional tasks to accelerate event processing. However, according to various aspects of the present invention, the parallel nature of the Common Event Infrastructure server 124 and corresponding appliances 106 allows the Common Event Infrastructure server 124 to function in its normal capacity should one or more appliances 106 be unavailable for XML processing.

Still further, mechanisms may be provided that build on standards-based protocols to augment requests received by appliances 106 with intermediate processing information as they pass through the appliance 106 to the corresponding server or other destination. As such, Common Event Infrastructure policies may be dynamically pushed to fronting Service Oriented Architecture appliances 106, enabling the transfer of expensive XML-based processing results from the server to the appliance.

Figure 6:
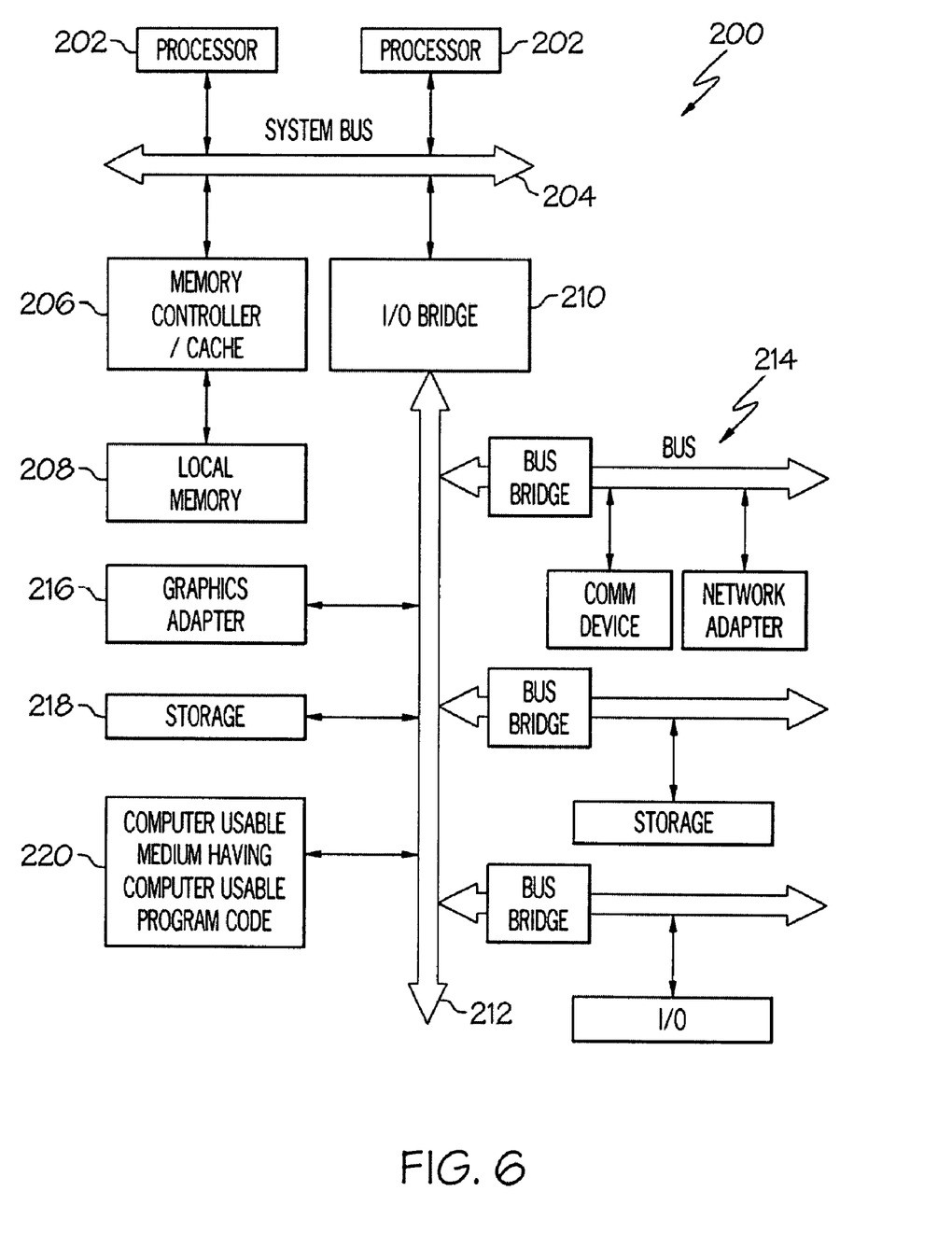
FIG. 6 is a block diagram of an exemplary computer system including a computer usable medium having computer usable program code embodied therewith, where the exemplary computer system is capable of executing a computer program product to provide offloading of server functions to corresponding appliance(s) according to various aspects of the present invention.

Referring to FIG. 6, a block diagram of a data processing system is depicted in accordance with the present invention. Data processing system 200, such as one of the processing devices 102 described with reference to FIGS. 1-5, may comprise a symmetric multiprocessor (SMP) system or other configuration including a plurality of processors 202 connected to system bus 204. Alternatively, a single processor 202 may be employed. Also connected to system bus 204 is memory controller/cache 206, which provides an interface to local memory 208. An I/O bus bridge 210 is connected to the system bus 204 and provides an interface to an I/O bus 212. The I/O bus may be utilized to support one or more buses and corresponding devices 214, such as bus bridges, input output devices (I/O devices), storage, network adapters, etc.

Also connected to the I/O bus may be devices such as a graphics adapter 216, storage 218 and a computer usable medium 220 having computer usable program code embodied thereon. The computer usable program code may be utilized, for example, to implement the method 150 of FIG. 3, the communication exchanges between the appliances 106 and the Common Event Infrastructure server 124 as illustrated in FIGS. 4-5 and/or any other various aspects of the present invention, such as the processing performed by the Common Event Infrastructure server 124 as described with reference to FIG. 2. The data processing system depicted in FIG. 6 may be, for example, an IBM® RS/6000® system, a product of International Business Machines Corporation in Armonk, N.Y., running the Advanced Interactive Executive (AIX®) operating system. An object oriented programming system such as Java® may run in conjunction with the operating system and provides calls to the operating system from Java programs or applications executing on the data processing system. ("IBM", "RS/6000", and "AIX" are registered trademarks of IBM, and "Java" is a registered trademark of Sun Microsystems, Inc., in the United States, other countries, or both.)

The various aspects of the present invention may be embodied as systems, computer-implemented methods and computer program products. Also, various aspects of the present invention may take the form of an entirely hardware embodiment, an entirely software embodiment (including software, firmware, micro-code, etc.) or an embodiment combining software and hardware, wherein the embodiment or aspects thereof may be generally referred to as a "circuit," "component" or "system." Furthermore, the various aspects of the present invention may take the form of a computer program product on a computer-usable storage medium having computer-usable program code embodied in the medium or a computer program product accessible from a computer-usable or computer-readable medium providing program code for use by or in connection with a computer or any instruction execution system.

The software aspects of the present invention may be stored, implemented and/or distributed on any suitable computer usable or computer readable medium(s). For the purposes of this description, a computer-usable or computer readable medium can be any apparatus that can contain, store, communicate, propagate, or transport the program for use by or in connection with the instruction execution system, apparatus, or device. The computer program product aspects of the present invention may have computer usable or computer readable program code portions thereof, which are stored together or distributed, either spatially or temporally across one or more devices. A computer-usable or computer-readable medium may comprise, for example, an electronic, magnetic, optical, electromagnetic, infrared, or semiconductor system, apparatus, device, or propagation medium. As yet further examples, a computer usable or computer readable medium may comprise cache or other memory in a network processing device or group of networked processing devices such that one or more processing devices stores at least a portion of the computer program product. The computer-usable or computer-readable medium may also comprise a computer network itself as the computer program product moves from buffer to buffer propagating through the network. As such, any physical memory associated with part of a network or network component can constitute a computer readable medium.

More specific examples of the computer usable or computer readable medium comprise for example, a semiconductor or solid state memory, magnetic tape, an electrical connection having one or more wires, a swappable intermediate storage medium such as floppy drive or other removable computer diskette, tape drive, external hard drive, a portable computer diskette, a hard disk, a rigid magnetic disk, a random access memory (RAM), a read-only memory (ROM), an erasable programmable read-only memory (EPROM or Flash memory), a portable compact disc read-only memory (CD-ROM), a read/write (CD-R/W) or digital video disk (DVD), an optical fiber, disk or storage device, or a transmission media such as those supporting the Internet or an intranet. The computer-usable or computer-readable medium may also comprise paper or another suitable medium upon which the program is printed or otherwise encoded, as the program can be captured, for example, via optical scanning of the program on the paper or other medium, then compiled, interpreted, or otherwise processed in a suitable manner, if necessary, and then stored in a computer memory. The computer-usable medium may include a propagated data signal with the computer-usable program code embodied therewith, either in baseband or as part of a carrier wave or a carrier signal. The computer usable program code may also be transmitted using any appropriate medium, including but not limited to the Internet, wire line, wireless, optical fiber cable, RF, etc.

A data processing system suitable for storing and/or executing program code may include at least one processor coupled directly or indirectly to memory elements, e.g., through a system bus or other suitable connection. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Computer program code for carrying out operations of the present invention may be written in any suitable language, including for example, an object oriented programming language such as Java, Smalltalk, C++ or the like. The computer program code for carrying out operations of the present invention may also be written in conventional procedural programming languages, such as the "C" programming language, or in higher or lower level programming languages. The program code may execute entirely on a single processing device, partly on one or more different processing devices, as a stand-alone software package or as part of a larger system, partly on a local processing device and partly on a remote processing device or entirely on the remote processing device. In the latter scenario, the remote processing device may be connected to the local processing device through a network such as a local area network (LAN) or a wide area network (WAN), or the connection may be made to an external processing device, for example, through the Internet using an Internet Service Provider.

The present invention is described with reference to flowchart illustrations and/or block diagrams of methods, apparatus systems and computer program products according to embodiments of the invention. It will be understood that each block of the flowchart illustrations and/or block diagrams, and combinations of blocks in the flowchart illustrations and/or block diagrams may be implemented by system components or computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention may be practiced on any form of computer system, including a stand alone computer or one or more processors participating on a distributed network of computers. Thus, computer systems programmed with instructions embodying the methods and/or systems disclosed herein, or computer systems programmed to perform various aspects of the present invention and storage or storing media that store computer readable instructions for converting a general purpose computer into a system based upon the various aspects of the present invention disclosed herein, are also considered to be within the scope of the present invention. Once a computer is programmed to implement the various aspects of the present invention, including the methods of use as set out herein, such computer in effect, becomes a special purpose computer particular to the methods and program structures of this invention. The techniques necessary for this are well known to those skilled in the art of computer systems.

The flowchart and block diagrams in the Figures illustrate the architecture, functionality, and operation of possible implementations of systems, methods and computer program products according to various embodiments of the present invention. In this regard, one or more blocks in the flowchart or block diagrams may represent a component, segment, or portion of code, which comprises one or more executable instructions for implementing the specified logical function (s). In some alternative implementations, the functions noted in the blocks may occur out of the order noted in the figures. For example, two blocks shown in succession may, in fact, be executed substantially concurrently or in the reverse order.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the invention of the present application in detail and by reference to embodiments thereof, it will be apparent that modifications and variations are possible without departing from the scope of the invention defined in the appended claims.

What is claimed is:

1. A method of delegating processing functions from a server to a corresponding specialized appliance in an enterprise computing environment, wherein the appliance comprises a Service Oriented Architecture middleware appliance and the server comprises a Common Event Infrastructure server, the method comprising:

specifying at least one XML function for front-process offloading from the server to the corresponding appliance, wherein the appliance is located on an inbound network path to the server and is configured to intercept inbound messages which are destined for the server, the inbound messages being pushed from at least one message generator towards the server on the inbound network path, each of the at least one message generator operating at a device that is distinct from the server and from the appliance;

communicating at least one management directive from the server to the appliance, in response to dynamic run-time conditions evaluated by the server, the at least one management directive informing the appliance to configure itself to perform at least one of the at least one specified XML function on the intercepted messages, the communicated management directive for a particular specified XML function further specifying requirements that are dynamically specified, by the server, for implementing by the particular specified XML function when performed at the appliance, wherein the communicating comprises dynamically issuing, from the server to the appliance, at least one Simple Object Access Protocol based distributed management directive to instruct the appliance as to how the intercepted messages are to be managed; and communicating instructions from the server to the appliance to cause the appliance to dynamically augment intercepted messages by inserting intermediate processing information therein, based upon at least one of the at least one XML function performed at the appliance, as the intercepted messages pass through the appliance towards the server on the inbound network path.

2. The method according to claim 1, wherein at least one of the at least one management directive specifies a validation requirement for messages intercepted by the appliance, and wherein each of the intercepted messages that pass the validation requirement is forwarded by the appliance to a corresponding destination instead of, or in addition to, passing the intercepted message towards the server on the inbound network path.

3. The method according to claim 1, wherein at least one of the at least one management directive specifies an operation to be performed on the intercepted messages, the operation comprising at least one of message processing, message classification, or message routing, and wherein each of the intercepted messages is forwarded by the appliance to a corresponding destination based upon an outcome of the performed operation for the intercepted message.

4. The method according to claim 1, wherein the communicated management directive for the particular specified XML function specifies at least one of policy information, configuration information, or exception handling information that is to be used by the appliance when it performs the particular specified XML function.

5. The method according to claim 1, wherein the communicated management directive for the particular specified XML function issues policy directives to the appliance based upon the dynamic run-time conditions evaluated by the server, the dynamic run-time conditions detected by the server as the server communicates with devices in the enterprise computing environment.

6. A computer program product to delegate processing functions from a server to a corresponding specialized appliance in an enterprise computing environment, wherein the appliance comprises a Service Oriented Architecture middleware appliance and the server comprises a Common Event Infrastructure server, the computer program product comprising:

a non-transitory computer usable medium having computer usable program code embodied therewith, the computer usable program code configured to:

specify at least one XML function for front-process offloading from the server to the corresponding appliance, wherein the appliance is located on an inbound network path to the server and is configured to intercept inbound messages which are destined for the server, the inbound messages being pushed from at least one message generator towards the server on the inbound network path, each of the at least one message generator operating at a device that is distinct from the server and from the appliance;

communicate at least one management directive from the server, in response to dynamic run-time conditions evaluated by the server, to the appliance, the at least one management directive informing the appliance to configure itself to perform at least one of the at least one specified XML function on the intercepted messages, the communicated management directive for a particular specified XML function further specifying requirements that are dynamically specified, by the server, for implementing by the particular specified XML function when performed at the appliance, wherein the communicating comprises dynamically issuing, from the server to the appliance, at least one Simple Object Access Protocol based distributed management directive to instruct the appliance as to how the intercepted messages are to be managed; and communicate instructions from the server to the appliance to cause the appliance to dynamically augment intercepted messages by inserting intermediate processing information therein, based upon at least one of the at least one XML function performed at the appliance, as the intercepted messages pass through the appliance towards the server on the inbound network path.

7. The computer program product according to claim 6, wherein at least one of the at least one management directive specifies a validation requirement for messages intercepted by the appliance, and wherein each of the intercepted messages that pass the validation requirement is forwarded by the appliance to a corresponding destination instead of, or in addition to, passing the intercepted message towards the server on the inbound network path.

8. The computer program product according to claim 6, wherein at least one of the at least one management directive specifies an operation to be performed on the intercepted messages, the operation comprising at least one of message processing, message classification, or message routing, and wherein each of the intercepted messages is forwarded by the appliance to a corresponding destination based upon an outcome of the performed operation for the intercepted message.

9. The computer program product according to claim 6, wherein the communicated management directive for the particular specified XML function specifies at least one of policy information, configuration information, or exception handling information that is to be used by the appliance when it performs the particular specified XML function.

10. The computer program product according to claim 6, wherein the communicated management directive for the particular specified XML function issues policy directives to the appliance based upon the dynamic run-time conditions evaluated by the server, the dynamic run-time conditions detected by the server as the server communicates with devices in the enterprise computing environment.

11. A computer processing system to delegate processing functions from a server to a corresponding specialized appliance in an enterprise computing environment, wherein the appliance comprises a Service Oriented Architecture middleware appliance and the server comprises a Common Event Infrastructure server, the system comprising:

a computer comprising a processor and providing the server; and the appliance, located on an inbound network path to the server and configured to intercept inbound messages which are destined for the server, the inbound messages being pushed, on the inbound network path, towards the server from at least one message generator, each of the at least one message generator operating at a device that is distinct from the server and from the appliance, wherein the server is configured to communicate with the appliance over the inbound network path, using instructions executed by the processor, to:

specify at least one XML function for front-process offloading from the server to the appliance;

communicate at least one management directive from the server, in response to dynamic run-time conditions evaluated by the server, to the appliance, the at least one management directive informing the appliance to configure itself to perform at least one of the at least one specified XML function on the intercepted messages, the communicated management directive for a particular specified XML function further specifying requirements that are dynamically specified, by the server, for implementing by the particular specified XML function when performed at the appliance, wherein the communicating comprises dynamically issuing, from the server to the appliance, at least one Simple Object Access Protocol based distributed management directive to instruct the appliance as to how the intercepted messages are to be managed; and communicate instructions from the server to the appliance to cause the appliance to dynamically augment intercepted messages by inserting intermediate processing information therein, based upon at least one of the at least one XML function performed at the appliance, as the intercepted messages pass through the appliance towards the server on the inbound network path.

12. The system according to claim 11, wherein at least one of the at least one management directive specifies a validation requirement for messages intercepted by the appliance, and wherein each of the intercepted messages that pass the validation requirement is forwarded by the appliance to a corresponding destination instead of, or in addition to, passing the intercepted message towards the server on the inbound network path.

13. The system according to claim 11, wherein at least one of the at least one management directive specifies an operation to be performed on the intercepted messages, the operation comprising at least one of message processing, message classification, and message routing, and wherein each of the intercepted messages is forwarded by the appliance to a corresponding destination based upon an outcome of the performed operation for the intercepted message.

14. The system according to claim 11, wherein the communicated management directive for the particular specified XML function specifies at least one of policy information, configuration information, or exception handling information that is to be used by the appliance when it performs the particular specified XML function.

15. The system according to claim 11, wherein the communicated management directive for the particular specified XML function issues policy directives to the appliance, the policy directives based upon the dynamic run-time conditions evaluated by the server, the dynamic run-time conditions detected by the server as the server communicates with devices in the enterprise computing environment.

* * * * *